United States Patent
Katsuki (10) Patent No.: US 7,085,201 B2
(45) Date of Patent: Aug. 1, 2006

(54) OPTICAL DISC DRIVE AND METHOD OF CHECKING OPTICAL DISC

(75) Inventor: Hideaki Katsuki, Tokyo (JP)

(73) Assignee: Mitsumi Electric Co., Ltd. (JP)

( * ) Notice: Subject to any disclaimer, the term of this patent is extended or adjusted under 35 U.S.C. 154(b) by 204 days.

(21) Appl. No.: 10/674,328

(22) Filed: Sep. 29, 2003

(65) Prior Publication Data

US 2004/0062154 A1    Apr. 1, 2004

(30) Foreign Application Priority Data

Sep. 30, 2002   (JP)   .............................. 2002-287913

(51) Int. Cl.
*G11B 21/08*  (2006.01)
*G11B 5/58*  (2006.01)

(52) U.S. Cl. ............................. 369/30.18; 369/30.07; 369/53.21

(58) Field of Classification Search ...................... None
See application file for complete search history.

(56) References Cited

U.S. PATENT DOCUMENTS

| | | | | |
|---|---|---|---|---|
| 6,594,214 | B1 * | 7/2003 | Misaizu .................... | 369/53.11 |
| 2004/0114484 | A1 * | 6/2004 | Sako et al. .............. | 369/53.22 |
| 2004/0179449 | A1 * | 9/2004 | McGoldrick ............. | 369/53.22 |
| 2005/0008812 | A1 * | 1/2005 | Jackson et al. ............ | 428/64.4 |
| 2005/0074228 | A1 * | 4/2005 | Tsang et al. .................. | 386/96 |

FOREIGN PATENT DOCUMENTS

| | | |
|---|---|---|
| EP | 0165 320 A1 | 12/1985 |
| EP | 0706185 A1 | 4/1996 |
| EP | 0724263 A2 | 7/1996 |
| JP | 10-228754 | 8/1998 |
| JP | 285461 A | 10/2000 |

* cited by examiner

*Primary Examiner*—Tan Dinh
(74) *Attorney, Agent, or Firm*—Marger Johnson & McCollom, P.C.

(57) ABSTRACT

An optical disc drive 1 of the present invention can record and/or reproduce data including audio data and non-audio data onto and/or from a multi-session optical disc 2 when the optical disc is loaded into the optical disc drive. The optical disc drive 1 includes an optical pick-up 3 capable of moving in a radial direction of the loaded optical disc 2 to record or reproduce the data onto or from the loaded optical disc, means for sequentially acquiring the TOC information recorded in the lead-in areas of the multiple sessions in the loaded optical disc 2 by means of the optical pick-up 3, means for judging whether or not there is illegal TOC information in the acquired TOC information, means for acquiring track information of the at least one tracks recorded in the acquired session(s) before the session including the illegal TOC information in the case where it is judged that there is the illegal TOC information in the acquired TOC information, means for sequentially judging whether or not there is a non-audio track in which the non-audio data is recorded in the at least one tracks acquired, and means for invalidating all sessions on and after the session including the non-audio track in the case where it is judged that there is the non-audio track in the acquired tracks.

14 Claims, 7 Drawing Sheets

OPTICAL DISC DRIVE AND METHOD OF CHECKING OPTICAL DISC

FIELD OF THE INVENTION

The present invention is related to an optical disc drive that carries out recording and/or reproducing data onto and/or from an optical disc, and to a method of checking the loaded optical disc.

DESCRIPTION OF THE PRIOR ART

There are a single session mode and a multiple session (multisession) mode in the data recording modes of an optical disc such as a CD-R, a CD-RW or the like. An audio CD or a CD-ROM is an optical disc onto which data can be recorded in the single session mode, while an optical disc such as CD-R onto which data is recorded in a track-at-once mode is that onto which data is recorded in the multisession.

The optical disc onto which data is recorded in the multisession mode includes multiple sessions each having a lead-in area that is a mark for recording start, data (a program area), and a lead-out area that is a mark for recording end in this order. The number of tracks included in the session, and TOC (Table Of Contents) information indicating whether there is the next session or not, or the like are recorded in the lead-in area.

In the optical disc having multiple sessions (hereinafter, the "optical disc having multiple sessions" will be also referred to simply as a "multisession optical disc"), the session in which audio data, voice data or music data (audio information) is recorded and the session in which non-audio data including image data or program data (non-audio information) is recorded may be mixed. In this case, generally audio data is recorded in at least first session of the optical disc (the optical disc may include multiple sessions each including audio data) and non-audio data is recorded in the session(s) following the audio session so that any audio players can play back the audio data recorded in the audio session, i.e., the first session of the optical disc.

An optical disc drive which can deal with the optical disc including multiple sessions can reproduce (play back) data including audio data and/or non-audio data from the optical disc. Further, an optical disc drive which can record and reproduce data onto and from the optical disc including multiple sessions can record (consecutively record) data onto the optical disc that can be recorded in any recording mode. In this regard, Laid-Open Japanese Patent Publication No. Hei. 10-228754 discloses a method of searching sessions (TOC information) of the optical disc including multiple sessions.

Figure 7:
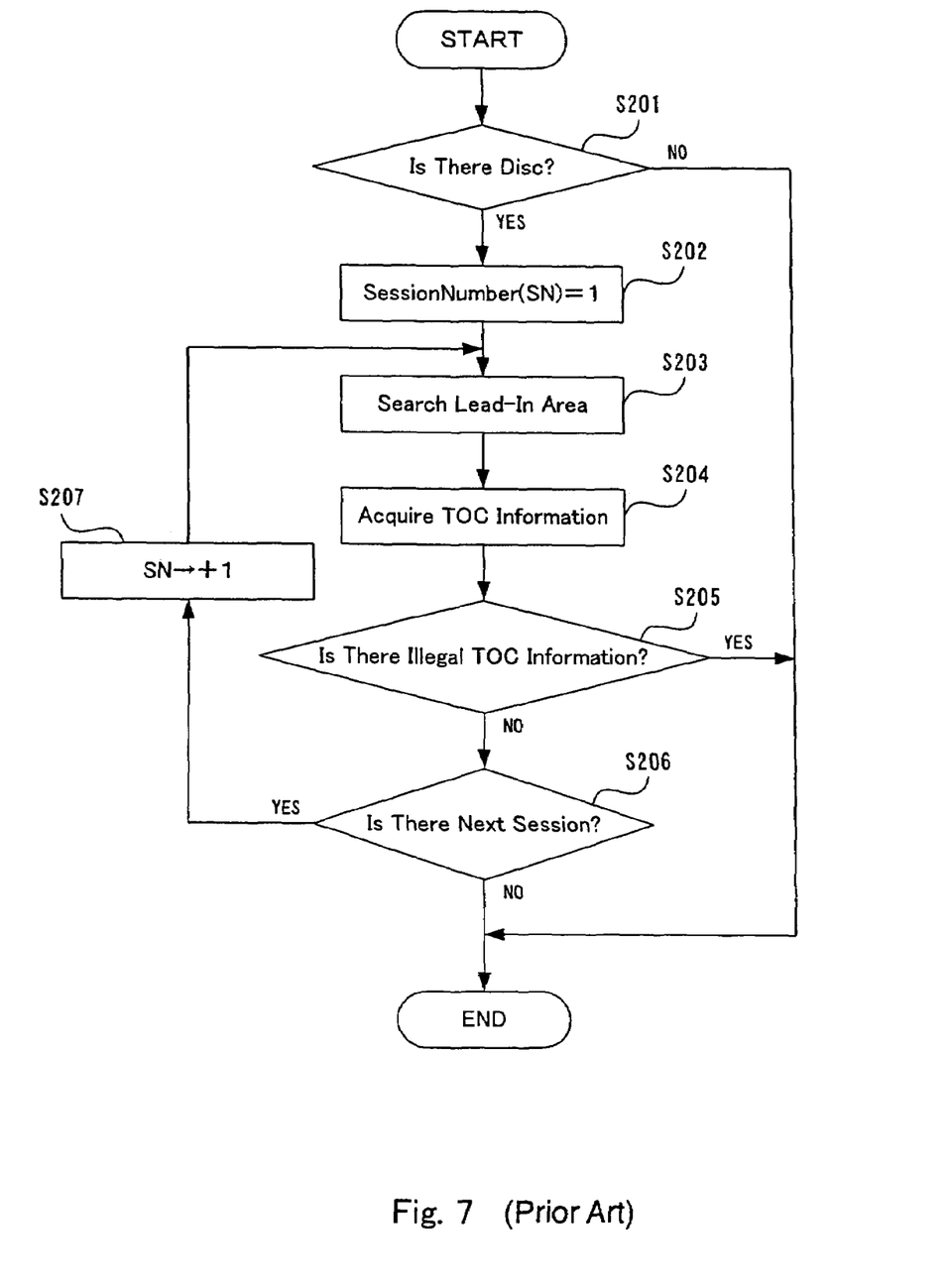
FIG. 7 is a flowchart illustrating checking process of an optical disc in a conventional optical disc drive.

Now, a description will be given for a method of checking an optical disc in a conventional optical disc drive. FIG. 7 is a flowchart illustrating checking process (a checking method) of an optical disc in a conventional optical disc drive. This checking process is carried out when the optical disc drive is switched on or a tray of the optical disc drive is displaced from a position for loading an optical disc (OPEN position) to a position for storing the optical disc (CLOSE position).

At Step S201, the optical disc drive (i.e., control section of the optical disc drive) judges whether or not there is an optical disc on the tray, namely, whether or not the optical disc is loaded in the optical disc drive. In the case where it is judged that an optical disc is not loaded in the optical disc drive, this process is terminated (completed). On the other hand, in the case where it is judged that the optical disc is loaded, the process proceeds to Step S202.

The optical disc drive sets "1" to a session number (SN), namely, specifies a first session (Step S202), searches the lead-in area of the first session (Step S203), and acquires the TOC information of this session (Step S204).

At Step S205, the optical disc drive judges whether or not there is illegal TOC information in the acquired TOC information. In the case where it is judged that there is the illegal TOC information, this process is terminated (suspended). On the other hand, in the case where it is judged that there is no illegal TOC information, the optical disc drive judges whether or not there is next session based on the TOC information (Step S206). In the case where it is judged that there is no next session, this process is terminated.

On the other hand, in the case where it is judged that there is next session, the session number increments by 1 (1 is added to the present session number) (Step S207), and then the optical disc drive repeatedly carries out the same process at Steps S203–S206 again. In this way, the checking process of the optical disc is completed (terminated) either when the optical disc drive acquires the TOC information of all the sessions in the optical disc or when the optical disc drive judges that there is illegal TOC information.

However, in the multisession optical disc including audio track(s) in which audio data is recorded and non-audio track(s) in which non-audio data is recorded, in the case where illegal TOC information is recorded in the lead-in area of any session, this results in various problems, namely, it may take long time for the optical disc drive to carry out checking process of the optical disc, and a host PC (personal computer) may recognize the optical disc by mistake (for example, lack of necessary information, or the previous session information is recorded in the TOC information of the lead-in area as the present session information, or the like), or the optical disc cannot be recognized at all.

SUMMARY OF THE INVENTION

It is an object of the present invention to provide an optical disc drive and a method of checking the loaded optical disc including multiple sessions, which can reproduce (play back) at least audio data (audio information) in the case where illegal TOC information is recorded in the lead-in area of any session.

In order to achieve the object, in one aspect of the present invention, the present invention is directed to an optical disc drive which can record and/or reproduce data including audio data and non-audio data onto and/or from an optical disc when the optical disc is loaded into the optical disc drive. The optical disc is a multi-session optical disc including multiple sessions, each session having a lead-in area in which TOC information is recorded, a data area including at least one tracks in which either audio data or non-audio data is recorded, and a lead-out area. The optical disc drive of the present invention comprises:

an optical pick-up capable of moving in a radial direction of the loaded optical disc to record or reproduce the data onto or from the loaded optical disc;

TOC information acquiring means for sequentially acquiring the TOC information recorded in the lead-in areas of the multiple sessions in the loaded optical disc by means of the optical pick-up;

TOC information judging means for judging whether or not there is illegal TOC information in the TOC information acquired by the TOC information acquiring means;

track information acquiring means for acquiring track information of the at least one tracks recorded in the session(s) that have been acquired by the TOC information acquiring means before the session including the illegal TOC information in the case where the TOC information judging means judges that there is the illegal TOC information in the acquired TOC information;

non-audio track judging means for sequentially judging whether or not there is a non-audio track in the at least one tracks acquired by the track information acquiring means, the non-audio data being recorded in the non-audio track; and session invalidating means for invalidating all sessions on and after the session including the non-audio track in the case where the non-audio track judging means judges that there is the non-audio track in the acquired tracks.

In this case, it is preferred that the track information includes a number of tracks in each session.

In this invention, it is preferred that the optical disc drive further comprises a memory for temporarily storing the TOC information of each of the sessions acquired by the TOC information acquiring means.

In this case, it is preferred that the track information acquired by the track information acquiring means is temporarily stored in the memory.

Further, in this invention, it is preferred that the optical disc drive further comprises means for making the TOC information acquiring means stop acquiring the TOC information of each of the sessions after the session including the illegal TOC information in the case where the TOC information judging means judges that there is the illegal TOC information in the acquired TOC information.

Furthermore, it is preferred that the optical disc drive is constructed so as to be able to play back the session(s) including audio track(s) that are not invalidated by the session invalidating means.

In another aspect of the present invention, the present invention is directed to an optical disc drive which can record and/or reproduce data including audio data and non-audio data onto and/or from an optical disc when the optical disc is loaded into the optical disc drive. The optical disc is a multi-session optical disc including multiple sessions, each session having a lead-in area in which TOC information is recorded, a data area including at least one tracks in which either audio data or non-audio data is recorded, and a lead-out area. The optical disc drive of the present invention comprises:

an optical pick-up capable of moving in a radial direction of the loaded optical disc to record or reproduce the data onto or from the loaded optical disc;

TOC information acquiring means for sequentially acquiring the TOC information recorded in the lead-in areas of the multiple sessions in the loaded optical disc by means of the optical pick-up;

TOC information judging means for judging whether or not there is illegal TOC information in the TOC information acquired by the TOC information acquiring means;

non-audio track judging means for sequentially judging whether a first track in each of the sessions that have been acquired by the TOC information acquiring means before the session including the illegal TOC information is a non-audio track or not in the case where the TOC information judging means judges that there is the illegal TOC information in the acquired TOC information; and session invalidating means for invalidating all sessions on and after the session in which the first track is the non-audio track in the case where the non-audio track judging means judges that there is the non-audio track in the acquired first tracks.

In this invention, it is preferred that the optical disc drive further comprises a memory for storing the TOC information of each of the sessions acquired by the TOC information acquiring means.

Further, in this invention, it is preferred that the optical disc drive further comprises means for making the TOC information acquiring means stop acquiring the TOC information of each of sessions after the session including the illegal TOC information in the case where the TOC information judging means judges that there is the illegal TOC information in the acquired TOC information.

Furthermore, it is preferred that the optical disc drive is constructed so as to be able to play back the session(s) including audio track(s) that are not invalidated by the session invalidating means.

In yet another aspect of the present invention, the present invention is directed to a method of checking an optical disc when the optical disc is loaded into an optical disc drive. The optical disc drive can record and/or reproduce data including audio data and non-audio data onto and/or from the multi-session optical disc including multiple sessions, each session having a lead-in area in which TOC information is recorded, a data area including at least one tracks in which either audio data or non-audio data is recorded, and a lead-out area. The method comprising the steps of:

sequentially acquiring the TOC information recorded in the lead-in areas of the multiple sessions in the loaded optical disc by means of an optical pick-up;

judging means for judging whether or not there is illegal TOC information in the acquired TOC information;

acquiring track information of the at least one tracks recorded in the acquired session(s) before the session including the illegal TOC information in the case where it is judged that there is the illegal TOC information in the acquired TOC information;

sequentially judging whether or not there is a non-audio track in the at least one tracks acquired, the non-audio data being recorded in the non-audio track; and invalidating all sessions on and after the session including the non-audio track in the case where it is judged that there is the non-audio track in the acquired tracks.

In this invention, it is preferred that the method further comprises the step of:

stopping acquiring the TOC information of each of the sessions after the session including the illegal TOC information in the case where it is judged that there is the illegal TOC information in the acquired TOC information.

In yet another aspect of the present invention, the present invention is directed to a method of checking an optical disc when the optical disc is loaded into an optical disc drive. The optical disc drive can record and/or reproduce data including audio data and non-audio data onto and/or from the multi-session optical disc including multiple sessions, each session having a lead-in area in which TOC information is recorded, a data area including at least one tracks in which either audio data or non-audio data is recorded, and a lead-out area. The method comprising the steps of:

sequentially acquiring the TOC information recorded in the lead-in areas of the multiple sessions in the loaded optical disc by means of an optical pick-up;

judging whether or not there is illegal TOC information in the acquired TOC information;

sequentially judging whether a first track in each of the acquired sessions before the session including the illegal TOC information is a non-audio track or not in the case where it is judged that there is the illegal TOC information in the acquired TOC information; and invalidating all sessions on and after the session in which the first track is the non-audio track in the case where it is judged that there is the non-audio track in the acquired first tracks.

In this invention, it is preferred that the method further comprises the step of:

stopping acquiring the TOC information of each of the sessions after the session including the illegal TOC information in the case where it is judged that there is the illegal TOC information in the acquired TOC information.

The above described and other objects, structures and advantages of the present invention will be apparent when the following description of the preferred embodiment will be considered in connection with the accompanying drawings.

DETAILED DESCRIPTION OF THE PREFERRED EMBODIMENTS

The preferred embodiments of an optical disc drive and a method of checking the loaded optical disc including multiple sessions according to the present invention are described below with reference to FIGS. 1–6. Now, it should be noted that the embodiments (disclosure) are to be considered as an exemplification, and therefore this feature should not be intended to limit the present invention to the specific embodiments illustrated. In this regard, the method of checking (confirming) the loaded optical disc including multiple sessions is the process in which the TOC information recorded in all of the sessions of an optical disc is read out (reproduced) initially in an optical disc drive when the optical disc is loaded on a disc tray of the optical disc drive.

Figure 1:
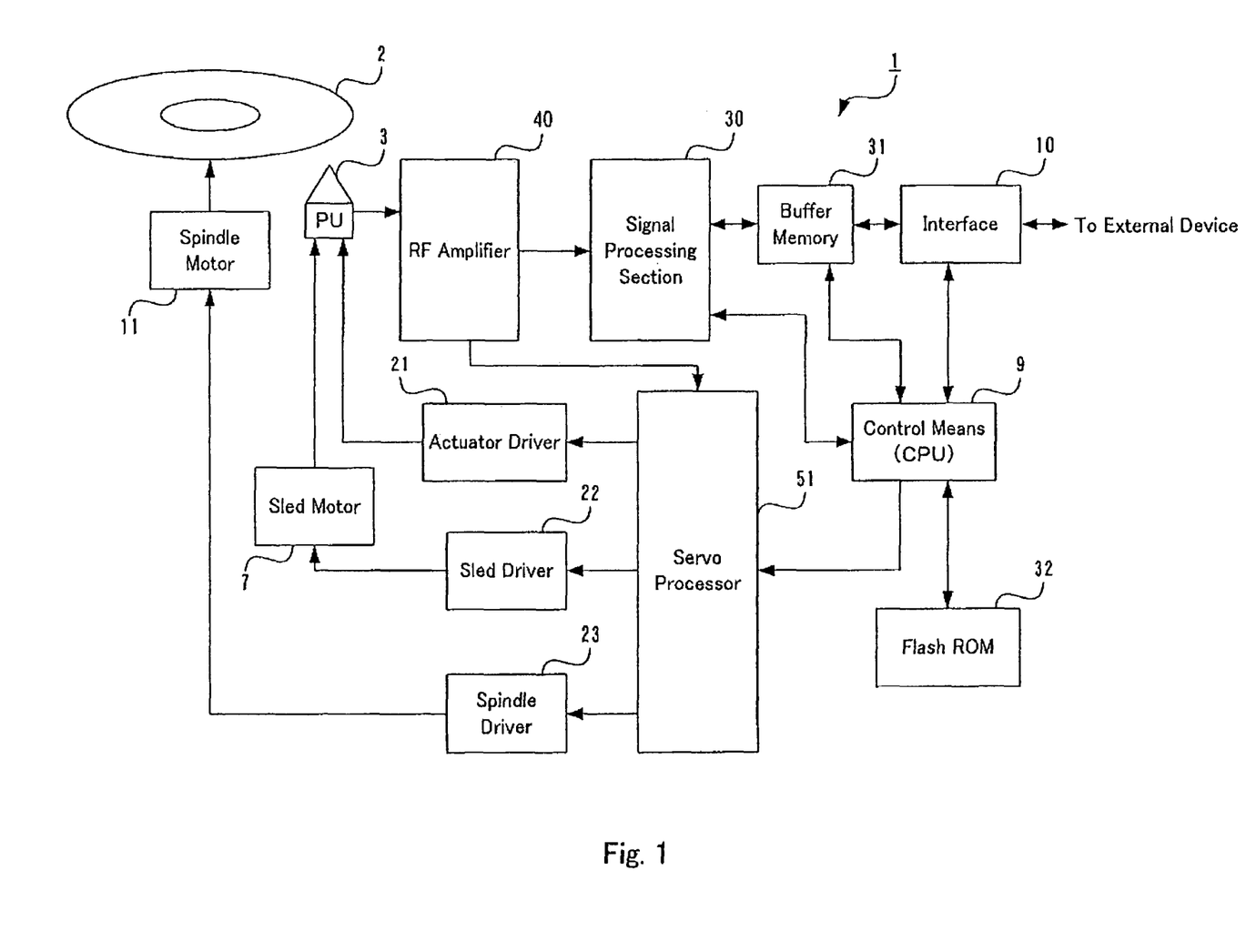
FIG. 1 is a schematic block diagram illustrating the main portion (circuit structure diagram) of the optical disc drive 1 of the present invention.
Figure 2:
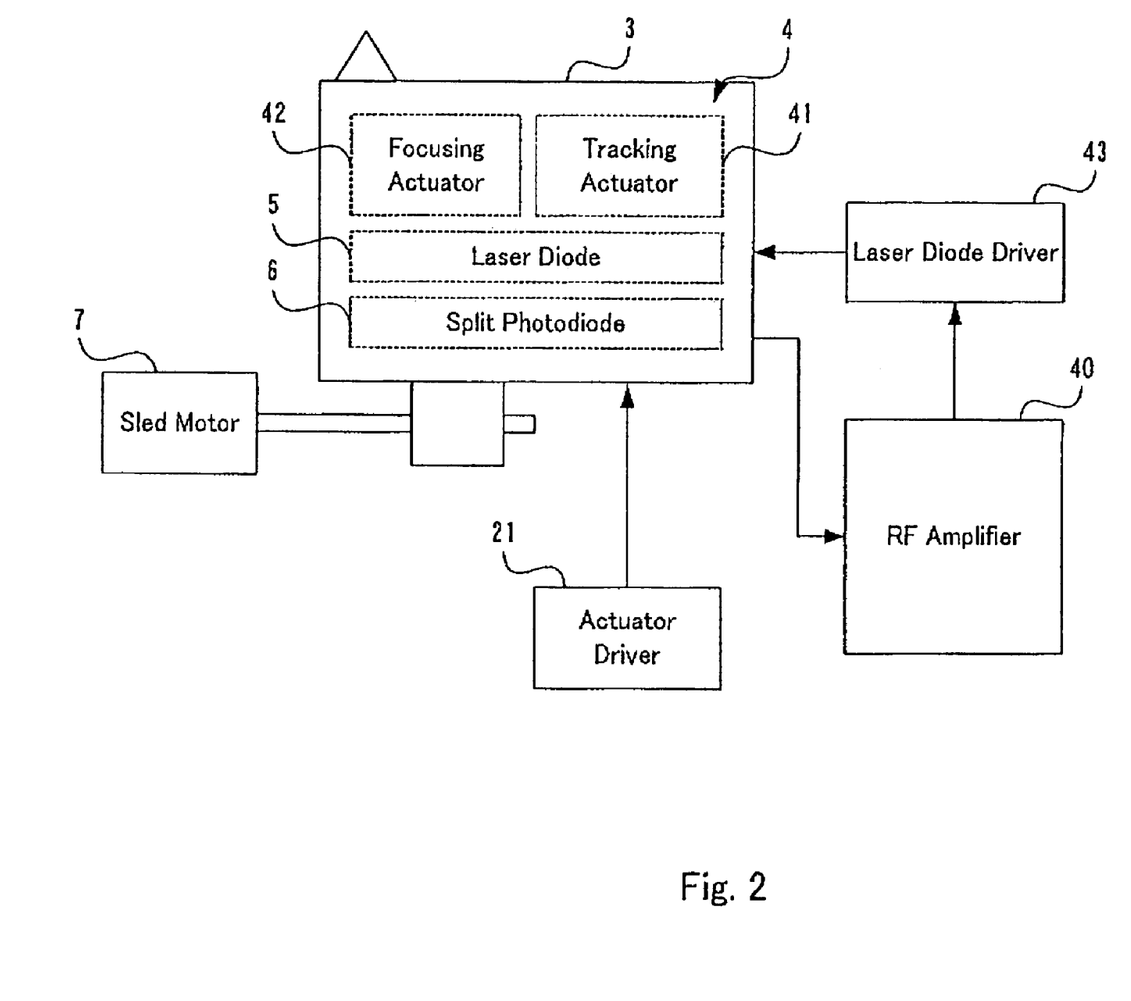
FIG. 2 is a diagram schematically illustrating an optical pick-up 3 and a part of elements related thereto.

First, a description will be given for the structure of an optical disc drive 1 of the present invention. FIG. 1 is a schematic block diagram illustrating the main portion (circuit structure diagram) of the optical disc drive 1 of the present invention. In FIG. 1, the optical disc drive 1 of the present invention is a disc drive that records and/or reproduces data onto and/or from an optical disc 2 such as a CD-ROM, a CD-R, a CD-RW or the like. Further, FIG. 2 is a diagram schematically illustrating an optical pick-up 3 and a part of elements related thereto. Hereinafter, the description will be given based on FIGS. 1 and 2. Here, even though it is not shown in the drawings, the optical disc drive 1 of the present invention is operated by an AC or DC power source supplied from the outside.

The optical disc drive 1 is equipped with a turntable (not shown in the drawings) on which the optical disc 2 is loaded, and a spindle motor 11 that rotates the turntable (i.e., the loaded optical disc 2) at a predetermined constant linear velocity. Further, the optical disc drive 1 is also equipped with a disc tray (not shown in the drawings) on which a media (optical disc) such as a CD-ROM, a CD-R, a CD-RW or the like is placed (loaded). The disc tray is moved (displaced) between a position for loading or ejecting the optical disc and a position for recording or reproducing information onto or from the optical disc.

Further, the optical disc drive 1 includes: an optical pick-up (optical head) 3 which is capable of moving in a radial direction of the loaded optical disc 2 (i.e., a radial direction of the turntable) to reproduce or record data from or onto the loaded optical disc 2; an optical pick-up base moving mechanism (not shown in the drawings) equipped with a sled motor 7 which moves an optical pick-up base of the optical pick-up 3 in the radial direction of the optical disc 2; an RF amplifier 40 which amplifies RF signals obtained by the optical pick-up 3 and then digitizes such RF signals to outputs digital data; a servo processor 51 which controls the driving (operation) of each drive portion of the spindle motor 11 and the like of the optical disc drive 1 based on the RF signals; a signal processing section 30 which demodulates (decodes) the sampling data (EFM signals), the sub-code data (digital data) and the like from the RF signals inputted from the RF amplifier 40; a buffer memory 31 which temporarily stores the sampling data (EFM signals) and the like demodulated by the signal processing section 30 and temporarily stores the data transferred from the host to be recorded onto the optical disc 2; control means (CPU) 9; a flash ROM 32 for storing optimized firmware and the like for the optical disc drive 1; an interface 10 which outputs the EFM signals and the like that were demodulated in the signal processing section 30 and temporarily stored in the buffer memory 31 to an external device (for example, host computer); an actuator driver 21 for driving actuators of the optical pick-up 3; a sled driver 22 for driving the sled motor 7; and a spindle driver 23 for driving the spindle motor 11; and a casing (not shown in the drawings) which houses all these elements. A detailed description of each portion is given below.

The control means 9 is generally constituted from a microcomputer (CPU). The control means 9 controls the overall of the elements of the optical disc drive 1, including the optical pick-up 3 (including the actuator 4, a laser diode 5, and the like), the sled motor 7, the spindle motor 11, the RF amplifier 40, the signal processing section 30, the servo processor 51, the interface 10, the buffer memory 31, the flash ROM 32 and the like. Further, TOC information judging means, non-audio track judging means, first track judging means, and session invalidating means (will be described later) in the present invention are mainly carried out by the control means 9.

In FIG. 2, the optical pick-up 3 includes an optical pick-up base equipped with a laser diode (light emitting portion) 5 and a split photodiode (light receiving portion) 6, and an objective lens (condenser) (not shown in the drawings) provided in the optical pick-up base.

The laser diode 5 is driven by a laser diode driver 43 controlled by the RF amplifier 40 and the control means 9 (not shown in FIG. 2), and emits a laser beam having a predetermined wavelength and any one of multiple power levels onto the optical disc 2. The split photodiode 6 includes one or more light receiving portions (not shown in the drawings) that receives the reflected light from the optical disc 2 of the light (laser beam) emitted from the laser diode 5. In the split photodiode 6, electric signals (reflected light-detection signals) of the voltage level corresponding to the amount of reflected light received by the light receiving portions are generated and outputted to the RF amplifier 40.

The objective lens is supported by suspension wires provided in the optical pick-up base, and is constructed so as to be capable of movement with respect to the optical pick-up base both in the radial direction of the optical disc 2 and in the rotational axis direction of the spindle motor 11 (i.e., a rotational axis direction of the turntable or an optical axis direction of the objective lens).

Further, the objective lens is arranged at a reference position (center point) for the objective lens which is predetermined on the optical pick-up base, namely, at a neutral position. When the objective lens is shifted from such reference position, the objective lens is biased toward the reference position by the restoring force of the suspension wires described above.

Further, as shown in FIG. 2, the optical pick-up 3 also includes the actuator 4 for moving the objective lens with respect to the optical pick-up base. The actuator 4 comprises a tracking actuator 41 for moving the objective lens in the radial direction of the optical disc 2, and a focusing actuator 42 for moving the objective lens with respect to the optical pick-up base in the rotational axis direction of the optical disc 2. The actuator 4, namely, the tracking actuator 41 and the focusing actuator 42 are constituted from a tracking coil and a focusing coil, which are driven by means of the actuator driver 21 by flowing electric current through the tracking coil and/or the focusing coil to interact with the magnetic fields of magnets (not shown in the drawings) provided near the coils.

When the objective lens follows tracks of the optical disc 2, it is possible to make the objective lens follow the tracks just by driving the tracking actuator 41 via the actuator driver 21 by control of the servo processor 51 within a range in which the objective lens can follow the tracks without moving the optical pick-up 3. On the other hand, in the case where the objective lens cannot follow the tracks without moving the optical pick-up 3, the servo processor 51 drives the sled motor 7 via the sled driver 22 to move the optical pick-up base in the same direction as the direction in which the objective lens was moved, thereby carrying out control so that the objective lens returns to the reference position. This control operation is referred to as sled control. In the movement control of the optical pick-up 3 in accordance with a seek command (a seek operation includes a rough search and a fine search), such sled control is carried out in the case where the rough search is conducted.

When the reflected light detection signals are supplied to the RF amplifier 40 from the split photodiode 6 of the optical pick-up 3, the RF amplifier 40 generates HF (RF) signals, tracking error (TE) signals, focusing error (FE) signals and the like based on such reflected light detection signals. In this regard, the RF signals are analog signals corresponding to pits and lands written on the optical disc 2, and the tracking error signals are signals indicating the size and direction of the shift of the objective lens in the radial direction from the center of the track (i.e., the amount of shift of the objective lens in the radial direction from the center of the track). Further, the focusing error signals are signals indicating the size and direction of the shift of the objective lens in the optical axis direction (rotational axis direction) from the focusing position (i.e., the amount of shift of the objective lens in the optical axis direction (rotation axis direction) from the focusing position).

Further, the RF amplifier 40 generates digitized signals by data-slicing the generated RF signals, and supplies these signals to the signal processing section 30 as data signals for reproducing. The RF amplifier 40 also supplies the generated tracking error signals and focusing error signals to the servo processor 51.

Based on the tracking error signals and the focusing error signals supplied from the RF amplifier 40, the servo processor 51 controls the driving of the actuator 4 and/or the sled motor 7 via the actuator driver 21 and/or the sled driver 22 to properly move the optical pick-up 3 in the radial direction and the optical axis direction of the optical disc 2.

Further, based on WOBBLE signals reproduced from the optical disc 2 or output signals from hall elements, i.e., means for measuring a rotational speed of the spindle motor 11 (not shown in the drawings), which are disposed on the spindle motor 11, the servo processor 51 controls the driving of the spindle motor 11 via the spindle driver 23 to rotationally drive the optical disc 2 at a predetermined rotational speed.

In response to instructions from the control means 9, the signal processing section 30 demodulates (decodes) the reproduced signals supplied from the RF amplifier 40, and carries out predetermined signal processing. Then, the signal processing section 30 sequentially supplies the sampling data (EFM signals) and the like obtained by the signal processing such as demodulation and the like to the buffer memory 31, and then such data is supplied to the interface 10 via the buffer memory 31. The buffer memory 31 is constructed from a predetermined capacity RAM (Random Access Memory) or the like, and is a memory for temporarily storing the sampling data (EFM signals) demodulated in the signal processing section 30 and TOC information and the like read out from the lead-in area of the optical disc 2.

In response to instructions from the control means 9, the interface 10 transmits the sampling data (i.e., the data recorded on the optical disc 2) and the like supplied from the buffer memory 31 to an external device (for example, a host computer such as a personal computer (PC) or the like), and receives the commands executed by the optical disc drive 1, the data to be recorded on the optical disc 2 and the like from the external device. The interface 10 uses an existing interface standard such as ATAPI, SCSI or the like.

The flash ROM 32 is a kind of EEPROM (Electrically Erasable and Programmable Read Only Memory) for storing firmware and the like, and generally firmware and the like for carrying out basic control of the optical disc drive 1 are pre-stored in the flash ROM 32.

Figure 3:
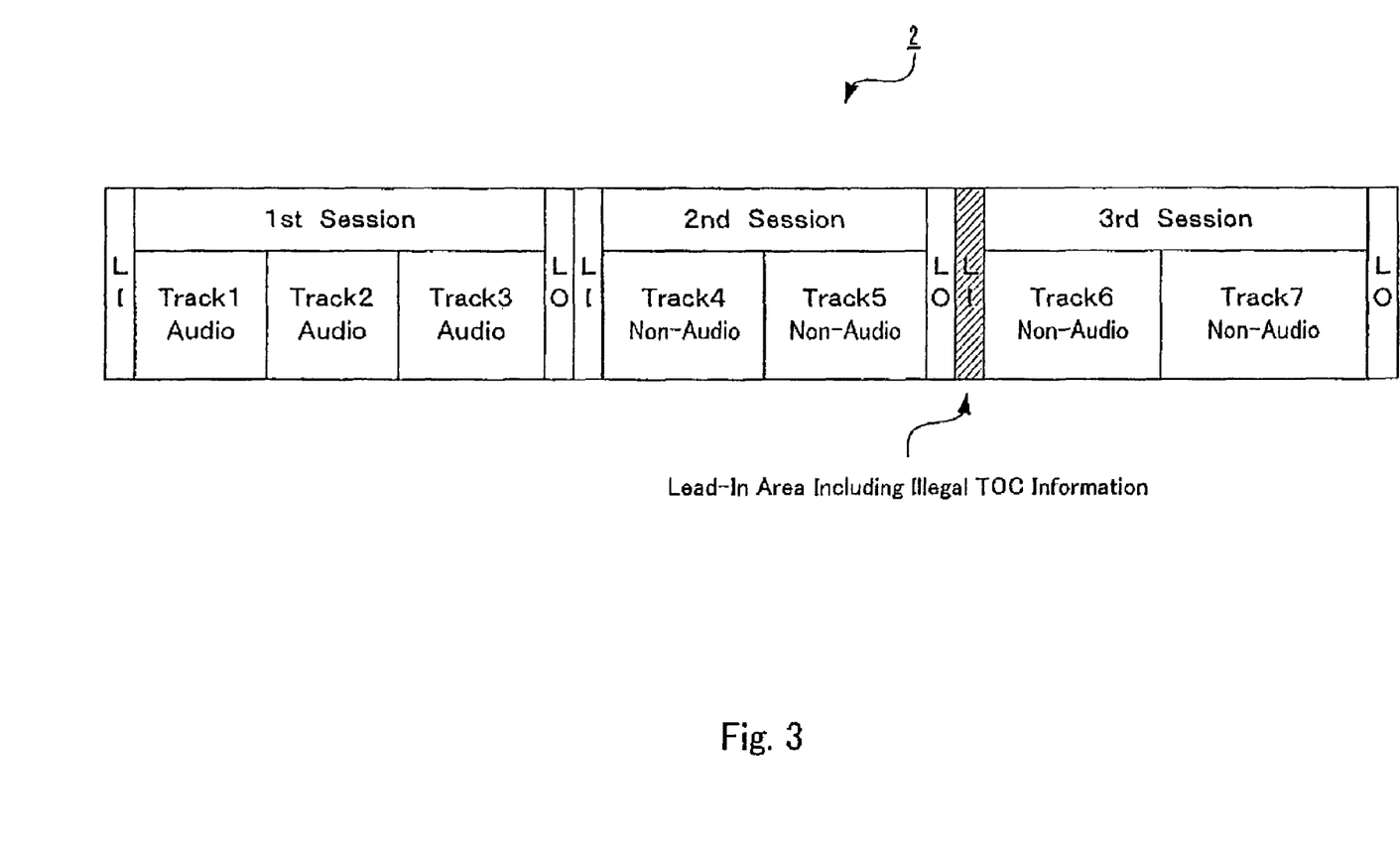
FIG. 3 is a schematic diagram illustrating one example of the optical disc including illegal TOC information.

Next, a description will be given for the structure of the optical disc having the session including illegal TOC information. FIG. 3 is a schematic diagram illustrating one example of the optical disc including illegal TOC information. As shown in FIG. 3, the optical disc 2 is consisted of three sessions, in which there are three audio tracks in a first session, two non-audio tracks in a second session, and two non-audio tracks in a third session. In this case, the optical disc drive 1 and the method of checking the loaded optical disc can be applied to the optical disc 2 in which illegal TOC information is included in the TOC information recorded in the lead-in area of the third session, for example.

In this regard, the "illegal TOC information" includes the case where there is a defect on the corresponding session, the case where the TOC information includes a format violation, and the case where the TOC information deferent from that of the corresponding session is recorded in the lead-in area of the session.

Figure 4:
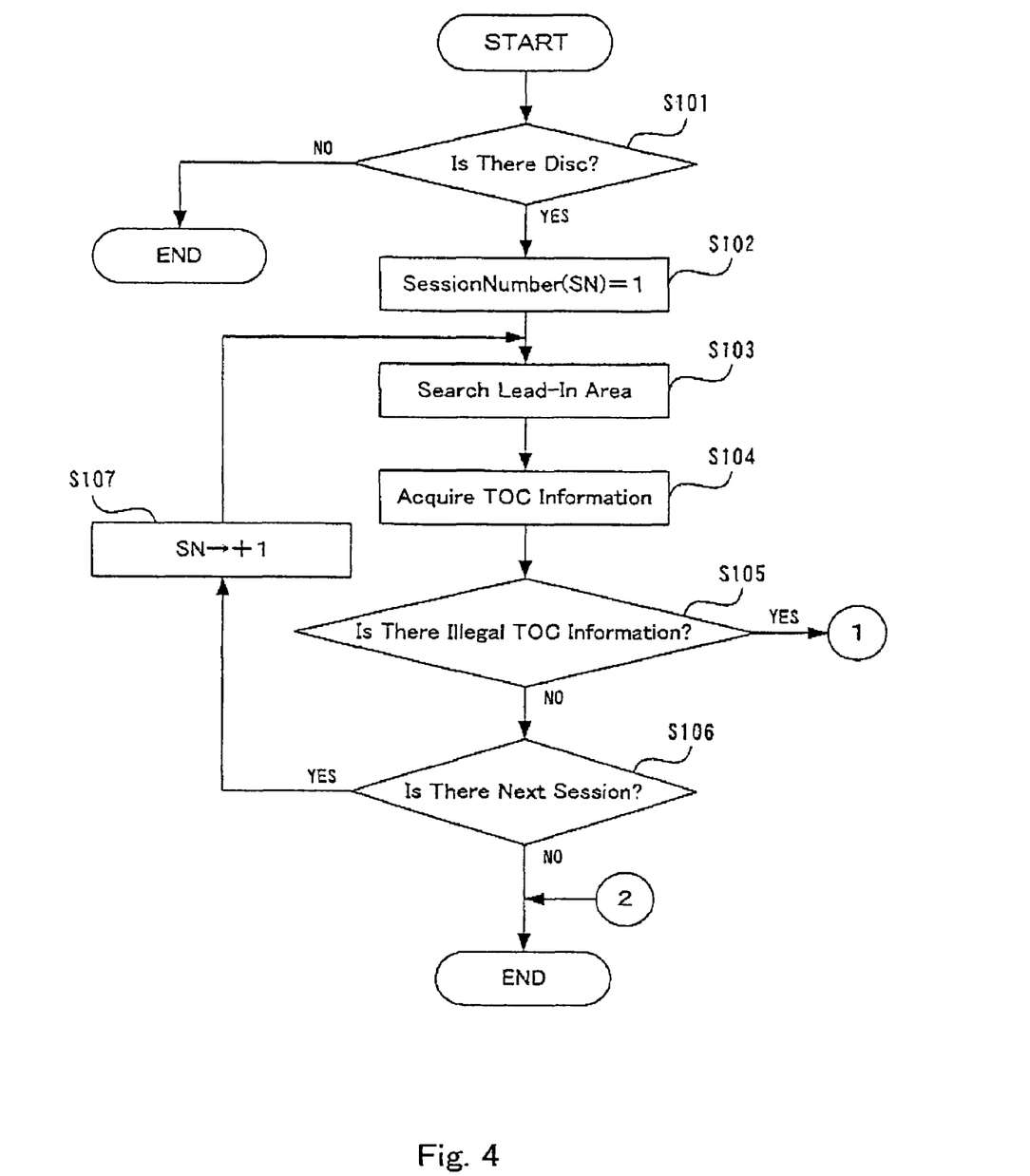
FIG. 4 is a flowchart illustrating reproducing process of an optical disc in one embodiment according to the present invention.
Figure 5:
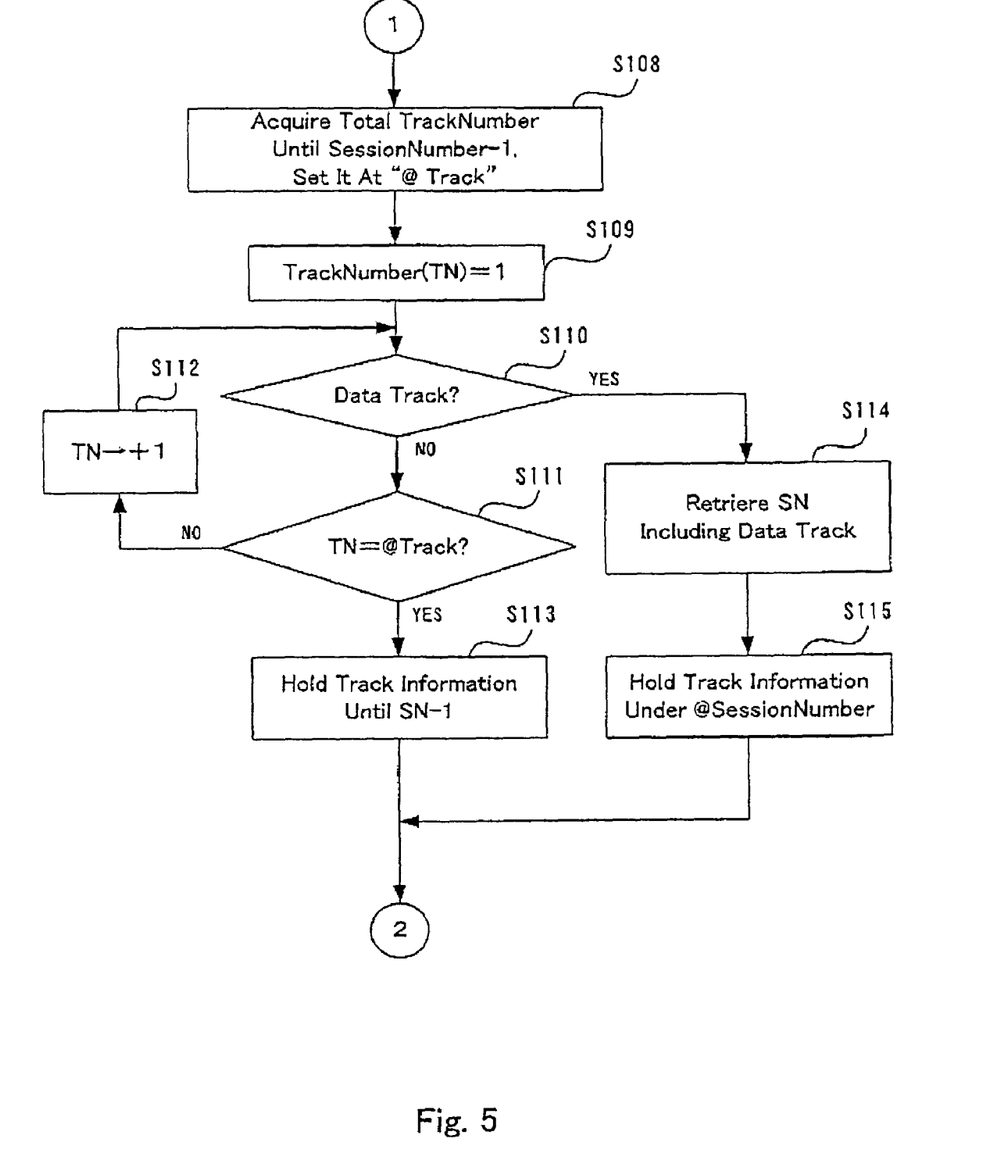
FIG. 5 is a flowchart illustrating reproducing process of an optical disc in one embodiment according to the present invention.
Figure 6:
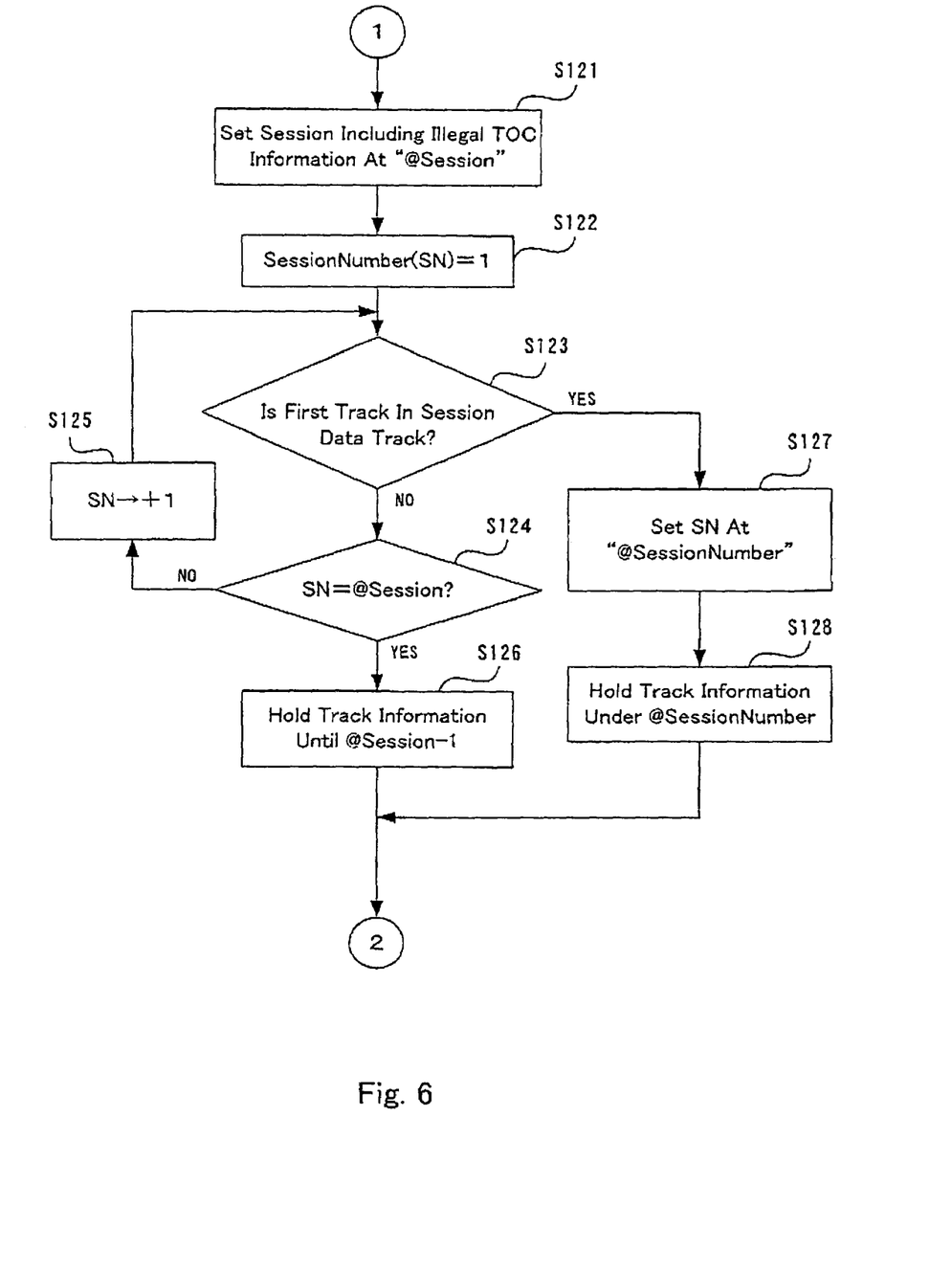
FIG. 6 is a flowchart illustrating reproducing process of an optical disc in another embodiment according to the present invention.

Next, the operation of the optical disc drive in the preferred embodiment according to the present invention will be described with reference to the flowchart of FIGS. 4–6. FIGS. 4 and 5 are a flowchart illustrating reproducing process of an optical disc in one embodiment according to the present invention. This flowchart is described below using each of the elements shown in FIGS. 1 and 2 described above and the structure of the optical disc 2 shown in FIG. 3.

The checking (confirming) process (the method of checking an optical disc when the optical disc is loaded into the optical disc drive) of the present invention is carried out when alternating electric current is applied to the optical disc drive 1 and the disc tray is displaced form the OPEN position (where the optical disc is loaded on the disc tray) to CLOSE position (where the optical disc can be reproduced). First, at Step S101, the control means 9 judges (determines) whether or not there is the optical disc 2, namely, the loaded optical disc 2 is inserted into the optical disc drive 1. In the case where it is judged that there is no optical disc 2, this reproducing process is terminated (completed).

On the other hand, in the case where the optical disc 2 is loaded on the disc tray, the control means 9 sets "1" to a session number flag (SN) stored in the buffer memory 31, namely, specifies a first session (Step S102), searches the lead-in area of the first session (Step S103), and then the control means 9 (TOC information acquiring means) acquires the TOC information of the first session (Step S104).

At Step S105, the control means 9 judges whether or not there is illegal TOC information in the acquired TOC information based on the firmware and the like stored in the flash ROM 32. In the case where the illegal TOC information is includes in the acquired TOC information, the control means 9 proceeds to the steps in which the process described later is executed (carried out) (see FIGS. 5 and 6).

On the other hand, in the case where it is judged that the illegal TOC information is not included in the acquired TOC information, the control means 9 judges whether or not there is a next session based on this acquired TOC information (Step S106). Then, in the case where it is judged that there is no next session, this reproducing process is terminated (completed).

If there is a next session, for example, in the case of the track structure of the optical disc 2 as shown in FIG. 3, position information (time information) of the start position (start time) of the lead-in area of the second session is recorded in the TOC information in the lead-in area of the first session. Thus, in this case, the control means 9 sets "2" to the session number flag in the buffer memory 31 by means of increment of the session number flag (Step S107), and then repeatedly carries out the same process at Steps S103–S106.

In the optical disc 2 shown in FIG. 3, since illegal TOC information is not included in the second session of the optical disc 2, the control means 9 again judges whether or not there is a next session (i.e., third session) (Step S106). In the example shown in FIG. 3, since there is the next session, the control means sets "3" to the session number flag in the buffer memory 31 by means of increment of the session number flag (Step S107), and then repeatedly caries out the same process at Steps S103–S106.

On this new process, since the illegal TOC information is included in the TOC information in the lead-in area of the third session in the optical disc 2 shown in FIG. 3, the control means 9 proceeds to next process, i.e., to Step S108.

When the session including the illegal TOC information is identified at Step S105 (in the optical disc 2 shown in FIG. 3, this session is the third session), the control means 9 (track information acquiring means) acquires a total number of tracks and track information thereof in the judged session numbers except for the session including the illegal TOC information (for example, in the example shown in FIG. 3, first and second sessions) to store the total number of tracks as "@Track" in the buffer memory 31, and assigns (sets) serial number to these tracks (Step S108). Since there are three tracks in the first session and two tracks in the second session in the optical disc 2 shown in FIG. 3, "@Track" is 5 in this example.

The control means 9 sets "1" to a track number flag (TN) (Step S109), and then, the control means 9 (non-audio track judging means) judges whether or not track 1, i.e., the first track of the optical disc 2 (the track corresponding to the track number flag) is a non-audio track (Step S110). In the case where it is judged that the track 1 is not a non-audio track (i.e., the first track is an audio track), the control means 9 judges whether or not the present track number is "@Track" (Step S111). In the case where the present track number is not equal to "@Track," i.e., the present track number is less than "@Track," the control means 9 sets "2" to the track number flag in the buffer memory 31 by means of increment of the track number flag (Step S112), and then carries out the same steps (i.e., Steps S110 and S111). In this way, the control means 9 sequentially judges whether or not the track of the present track number is a non-audio track. In the case where the control means 9 finds a non-audio track in this process (Step S110), the control means 9 sets the session number corresponding to the session including the found non-audio track to "@SessionNumber" (Step S114). In the optical disc 2 shown in FIG. 3, since the control means 9 detects (finds) that there is a non-audio track in Track4 (the fourth track), "@SessionNumber" is 2 (second session) including Track4.

Then, the control means 9 holds (keeps) the track information of all the sessions before the session corresponding to "@SessionNumber" (in FIG. 3, the data (information) of the tracks 1–3) in the buffer memory 31 (Step S115), and then this process is terminated (completed). In this case, the held information (held data) includes only audio data (audio tracks), and all the sessions on and after the session including the non-audio track are invalidated (by session invalidating means).

On the other hand, at Step S110, the control means 9 judges whether or not the track is a non-audio track with respect to all the acquired tracks. Then, in the case where it is judged that all the tracks are not non-audio tracks (i.e., all the tracks are audio tracks), it is judged that the present track number is equal to "@Track" (Step S111), all of the track information corresponding to the total number of tracks is held in the buffer memory 31 (Step S113), and then this process is terminated (completed). In this case, the held information (held data) includes only audio data (audio tracks) as well as at Step S115.

As described above, according to the optical disc drive 1 and the checking method in one preferred embodiment of the present invention, even though there is illegal TOC information in the sessions of the optical disc including multiple sessions in which non-audio data is recorded, control means 9 (session invalidating means) invalidates all the sessions on and after the session including the non-audio track.

Accordingly, the present invention may allow at least the audio tracks in the optical disc 2, which are not invalidated by the optical disc drive 1, to be played back (reproduced) in application software such as CD player software of the host PC (Personal Computer) because the optical disc 2 is recognized at least as an audio disc by the host PC, even though the optical disc 2 includes illegal TOC information.

Further, in the present invention, in the case where there is illegal TOC information in the optical disc 2, since all the non-audio tracks are invalidated (masked), this may shorten the processing time for recognizing the loaded optical disc 2, and may prevent the host PC from recognizing the loaded optical disc 2 by mistake.

Next, a description will be given for another embodiment of the optical disc drive according to the present invention. FIG. 6 is a flowchart illustrating reproducing process of an optical disc in another embodiment according to the present invention. This embodiment is shown in a flowchart of FIGS. 4 and 6, namely, the flowchart shown in FIG. 5 is replaced by the flowchart shown in FIG. 6 in this embodiment. Therefore, the description of the same steps (same process) at Steps S101–S107 is omitted.

When the session including the illegal TOC information is identified at Step S105 (in the optical disc 2 shown in FIG. 3, this session is the third session), the control means 9 stores the session including the illegal TOC information as "@Session" into the buffer memory 31 (Step S121).

The control means 9 sets "1" to a session number flag (SN) (Step S122), and then, the control means (first track judging means) judges whether or not the first track of the first session is a non-audio track (Step S123). In the case where it is judged that this track is not a non-audio track (i.e., this track is an audio track), the control means 9 judges whether or not the present session number is "@Session" (Step S124).

In the case where the present session is not equal to "@Session," i.e., the present session number is less than "@Session," the control means 9 sets "2" to the session number flag in the buffer memory 31 by means of increment of the session number flag (Step S125), and then judges whether or not the first track of the second session is a non-audio track (Steps S123).

On the other hand, in the case where it is judged that the session number is equal to "@Session" at Step S124, since it is believed that there is no non-audio tracks in the sessions before the session including the illegal TOC information, the control means 9 holds the track information in all the sessions of which the session numbers are less than "@Session" in the buffer memory 31 (Step S126), and then this process is terminated (completed). In this case, the held information (held data) includes only audio data (audio tracks).

In the case where the first track of any sessions (the session numbers are less than "@Session") is a non-audio track, i.e., the control means 9 finds a non-audio track in this process (Step S123), the control means 9 sets the session number corresponding to the session including the found non-audio track to "@SessionNumber" (Step S127). Then, the control means 9 holds (keeps) the track information of all the sessions before the session corresponding to "@SessionNumber" (in FIG. 3, the data (information) of the tracks 1–3) in the buffer memory 31 (Step S128), and then this process is terminated (completed). In this case, the held information (held data) includes only audio data (audio tracks) as well as at Step S126.

As described above, compared with the one preferred embodiment described above, in the optical disc drive 1 and the checking method in another preferred embodiment of the present invention, the optical disc drive 1 (i.e., the control means 9) judges only whether or not the first track of each of the sessions before the session including the illegal TOC information is a non-audio track.

Therefore, according to the optical disc drive 1 and the checking method in another preferred embodiment of the present invention, this checking process for reproducing (playing back) data from an optical disc 2 can be completed more quickly than the case of the one preferred embodiment.

In this regard, in these embodiments, the session number corresponding to the session including illegal TOC information, or the total number of tracks in addition to the session number corresponding to the session including illegal TOC information has already recognized after the illegal TOC information is detected, or the illegal TOC information is detected and then the total number of tracks is acquired. Therefore, the judgment whether the track (or the first track) is the non-audio track or not can be carried out in descending order of the track number (or the session number) other than the case where this is carried out in ascending order as described in the above embodiments.

It should be noted that, in the embodiments described above, the case where the optical disc drive reproduces data from an optical disc such as a CD-ROM, CD-R, CD-RW or the like is described, but the present invention is not limited to this case. It is possible to apply the optical disc drive and the checking method of the present invention to other various optical disc drives for recording and/or reproducing data onto and/or from various types of optical discs such as DVD-RW, DVD-RAM and the like.

As described above, it should be noted that, even though the optical disc drive and the checking method of the present invention has been described with reference to the preferred embodiments shown in the drawings, the present invention is not limited to these embodiments, it is of course possible to make various modifications to each element of the optical disc drive, and various elements described above can be replaced with any other element capable of performing the same or a similar function.

What is claimed is:

1. An optical disc drive which can record or reproduce data including audio data and non-audio data onto or from an optical disc when the optical disc is loaded into the optical disc drive, the optical disc being a multi-session optical disc including multiple sessions, each session having a lead-in area in which TOC information is recorded, a data area including at least one tracks in which either audio data or non-audio data is recorded, and a lead-out area, the optical disc drive comprising:

an optical pick-up moveable in a radial direction of the loaded optical disc to record or reproduce the data onto or from the loaded optical disc;

TOC information acquiring means for sequentially acquiring the TOC information recorded in the lead-in areas of the multiple sessions in the loaded optical disc by means of the optical pick-up;

TOC information judging means for judging whether or not there is illegal TOC information in the TOC information acquired by the TOC information acquiring means;

track information acquiring means for acquiring track information of the at least one tracks recorded in the session(s) that have been acquired by the TOC information acquiring means before the session including the illegal TOC information in the case where the TOC information judging means judges that there is the illegal TOC information in the acquired TOC information;

non-audio track judging means for sequentially judging whether or not there is a non-audio track in the at least one trucks acquired by the track information acquiring means, the non-audio data being recorded in the non-audio track; and session invalidating means for invalidating all sessions on and after the session including the non-audio track in the case where the non-audio track judging means judges that there is the non-audio track in the acquired tracks.

2. The optical disc drive according to claim 1, wherein the track information includes a number of tracks in each session.

3. The optical disc drive according to claim 1, further comprising a memory for temporarily storing the TOC information of each of the sessions acquired by the TOC information acquiring means.

4. The optical disc drive according to claim 3, wherein the track information acquired by the track information acquiring means is temporarily stored in the memory.

5. The optical disc drive according to claim 1, further comprising means for making the TOC information acquiring means stop acquiring the TOC information of each of the sessions after the session including the illegal TOC information in the case where the TOC information judging means judges that there is the illegal TOC information in the acquired TOC information.

6. The optical disc drive according to claim 1, wherein the optical disc drive is constructed so as to be able to play back the session(s) including audio track(s) that are not invalidated by the session invalidating means.

7. An optical disc drive which can record or reproduce data including audio data and non-audio data onto or from an optical disc when the optical disc is loaded into the optical disc drive, the optical disc being a multi-session optical disc including multiple sessions, each session having a lead-in area in which TOC information is recorded, a data area including at least one tracks in which either audio data or non-audio data is recorded, and a lead-out area, the optical disc drive comprising:

an optical pick-up moveable in a radial direction of the loaded optical disc to record or reproduce the data onto or from the loaded optical disc;

TOC information acquiring means for sequentially acquiring the TOC information recorded in the lead-in areas of the multiple sessions in the loaded optical disc by means of the optical pick-up;

TOC information judging means for judging whether or not there is illegal TOC information in the TOC information acquired by the TOC information acquiring means;

non-audio track judging means for sequentially judging whether a first track in each of the sessions that have been acquired by the TOC information acquiring means before the session including the illegal TOC information is a non-audio track or not in the case where the TOC information judging means judges that there is the illegal TOC information in the acquired TOC information; and session invalidating means for invalidating all sessions on and after the session in which the first track is the non-audio track in the case where the non-audio track judging means judges that there is the non-audio track in the acquired first tracks.

8. The optical disc drive according to claim 7, further comprising a memory for storing the TOC information of each of the sessions acquired by the TOC information acquiring means.

9. The optical disc drive according to claim 7, further comprising means for making the TOC information acquiring means stop acquiring the TOC information of each of sessions after the session including the illegal TOC information in the case where the TOC information judging means judges that there is the illegal TOC information in the acquired TOC information.

10. The optical disc drive according to claim 7, wherein the optical disc drive is constructed so as to be able to play back the session(s) including audio track(s) that are not invalidated by the session invalidating means.

11. A method of checking an optical disc when the optical disc is loaded into an optical disc drive, the optical disc drive being operative to record or reproduce data including audio data and non-audio data onto or from the optical disc, the optical disc being a multi-session optical disc including multiple sessions, each session having a lead-in area in which TOC information is recorded, a data area including at least one tracks in which either audio data or non-audio data is recorded, and a lead-out area, the method comprising the steps of:

sequentially acquiring the TOC information recorded in the lead-in areas of the multiple sessions in the loaded optical disc by means of an optical pick-up;

judging means forjudging whether or not there is illegal TOC information in the acquired TOC information;

acquiring track information of the at least one tracks recorded in the acquired session(s) before the session including the illegal TOC information in the case where it is judged that there is the illegal TOC information in the acquired TOC information;

sequentially judging whether or not there is a non-audio track in the at least one tracks acquired, the non-audio data being recorded in the non-audio track; and invalidating all sessions on and after the session including the non-audio track in the case where it is judged that there is the non-audio track in the acquired tracks.

12. The method according to claim 11, further comprising the step of:

stopping acquiring the TOC information of each of the sessions after the session including the illegal TOC information in the case where it is judged that there is the illegal TOC information in the acquired TOC information.

13. A method of checking an optical disc when the optical disc is loaded into an optical disc drive, the optical disc drive being operative to record or reproduce data including audio data and non-audio data onto or from the optical disc, the optical disc being a multi-session optical disc including multiple sessions, each session having a lead-in area in which TOC information is recorded, a data area including at least one tracks in which either audio data or non-audio data is recorded, and a lead-out area, the method comprising the steps of:

sequentially acquiring the TOC information recorded in the lead-in areas of the multiple sessions in the loaded optical disc by means of an optical pick-up;

judging whether or not there is illegal TOC information in the acquired TOC information;

sequentially judging whether a first track in each of the acquired sessions before the session including the illegal TOC information is a non-audio track or not in the case where it is judged that there is the illegal TOC information in the acquired TOC information; and invalidating all sessions on and after the session in which the first track is the non-audio track in the case where it is judged that there is the non-audio track in the acquired first tracks.

14. The method according to claim 13, further comprising the step of:

stopping acquiring the TOC information of each of the sessions after the session including the illegal TOC information in the case where it is judged that there is the illegal TOC information in the acquired TOC information.

* * * * *